Figure 1:
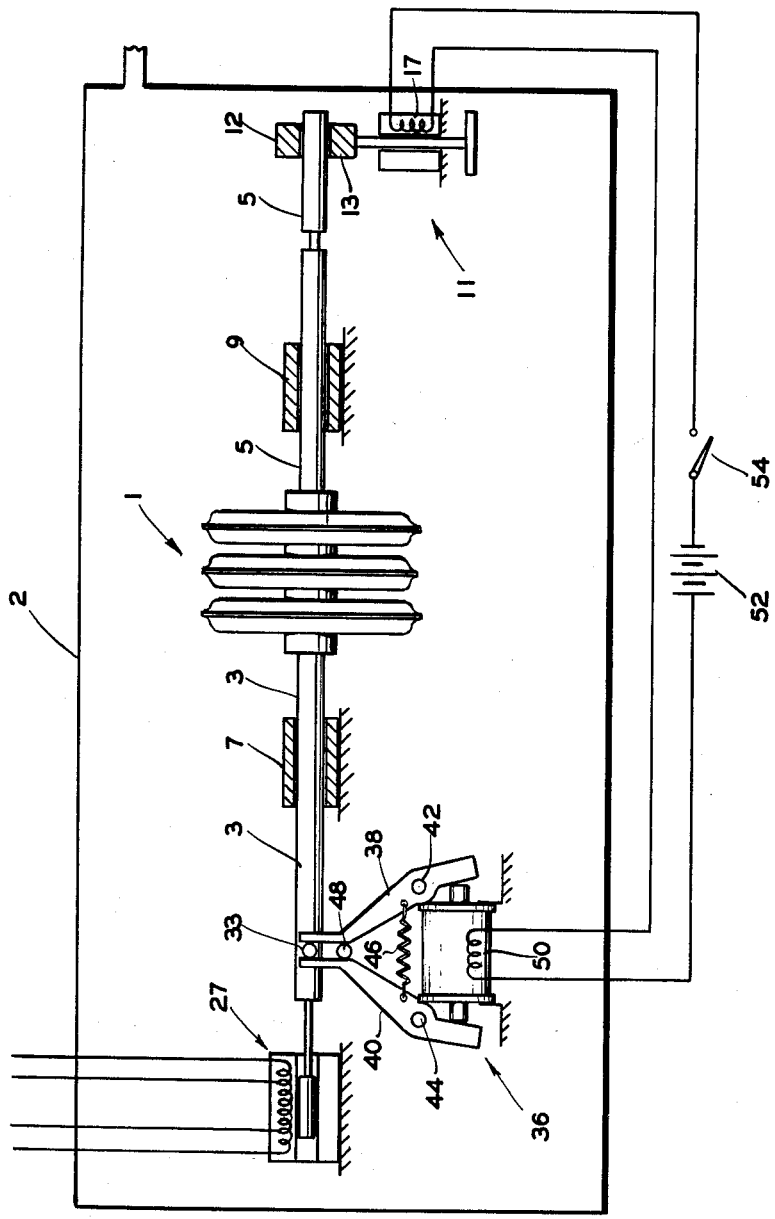

March 26, 1963 A. H. LE FEBVRE 3,083,343
BAROMETRIC ALTITUDE SENSITIVE SIGNAL CONTROL MECHANISM
Filed Oct. 24, 1960 2 Sheets-Sheet 1

INVENTOR.
ARTHUR H. LE FEBVRE
BY
Herbert L. Davis
ATTORNEY

INVENTOR.
ARTHUR H. LE FEBVRE
BY
ATTORNEY

United States Patent Office 3,083,343
Patented Mar. 26, 1963

3,083,343
BAROMETRIC ALTITUDE SENSITIVE SIGNAL
CONTROL MECHANISM
Arthur H. Le Febvre, Westwood, N.J., assignor to The
Bendix Corporation, Teterboro, N.J., a corporation of
Delaware
Filed Oct. 24, 1960, Ser. No. 64,548
4 Claims. (Cl. 336—30)

The invention relates to an improved barometric altitude sensitive signal control mechanism for generating an electrical signal in response to changes in ambient atmospheric pressure and more particularly to a novel instrument adapted for use in controlling an automatic pilot or aircraft altitude control system for operating the elevator surface of an aircraft so as to automatically maintain the craft flight at a predetermined altitude level as disclosed and claimed in U.S. Patent No. 2,512,902, granted June 27, 1950, to F. Henry S. Rossire and assigned to Bendix Aviation Corporation, now by change of name The Bendix Corporation.

An object of the invention is to provide a novel barometric altitude control device which will furnish a signal proportional to a deviation from a preselected altitude and a device in which the preselected altitude may be varied at the will of the operator throughout the range of operation of the mechanism.

Another object of the invention is to provide in such a barometric altitude control device a novel operator-operative means for alternately clamping and freeing either end of an evacuated diaphragm assembly to provide for the required signal output.

Another object of the invention is to provide in such a barometric altitude control device novel means whereby the sensing device may operate about a fixed null point so long as the mechanism is in operative relation with the accompanying control system or automatic pilot of an aircraft and in which the arrangement is such that when the sensing device is disengaged from the accompanying system the sensing device is free to assume its normal position relative to the barometric altitude without affecting the null position of the sensing device which is thereupon locked in the null position.

Another object of the invention is to provide a novel barometric altitude control mechanism having a sensing device to provide an electrical signal proportional to diaphragm assembly movement effected by changes in barometric altitude and a device in which there is provided an evacuated bellows or diaphragm assembly having control and supporting rods slidably mounted in bearings at opposite ends thereof and including a solenoid operated clamping device to provide a means for locking the supporting rod at one end of the diaphragm assembly when the solenoid is energized, together with a second solenoid actuated centering mechanism rendered effective upon deenergization thereof to lock in a null signal position an electrical signal device normally operated by the control rod at the opposite end of the diaphragm assembly, the locking mechanism acting to free the control rod at the opposite end of the diaphragm assembly when the first mentioned solenoid is energized, the arrangement being such that the first and second mentioned solenoids are serially controlled from the same electrical source by the operator of the device.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 2:
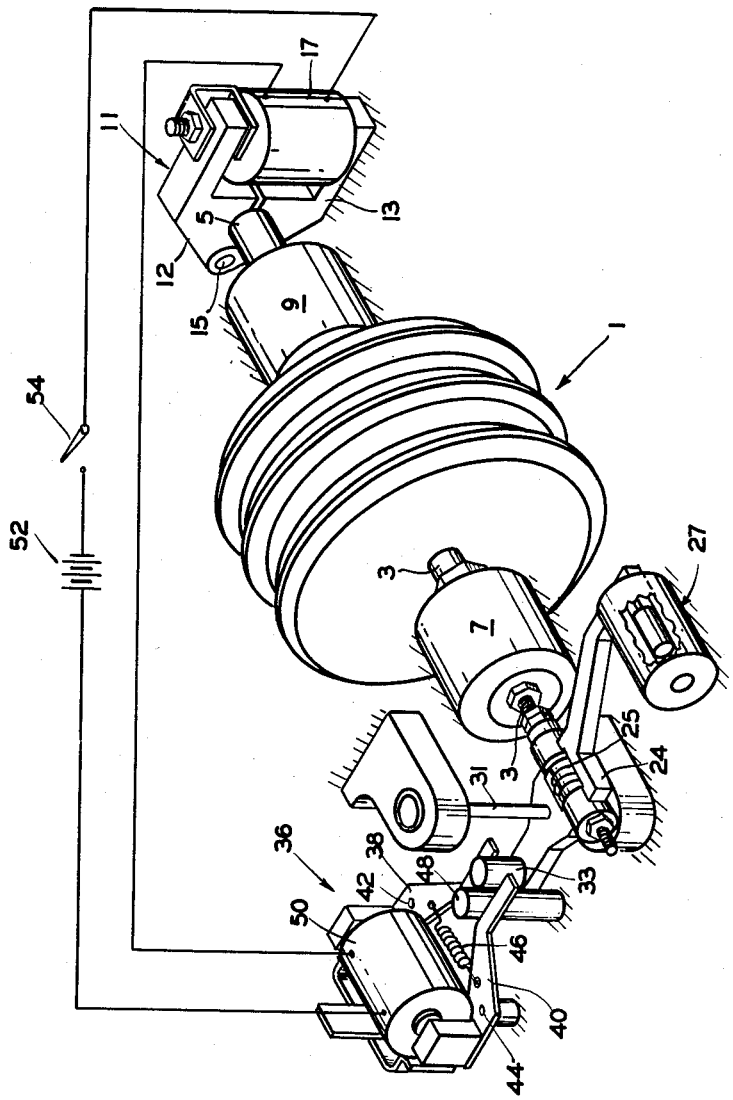

Referring to the drawings:
FIGURE 1 is a schematic drawing of the barometric altitude control mechanism forming the subject matter of the invention.
FIGURE 2 is a schematic perspective view of the structure of the barometric altitude control device embodying the invention.

Referring to the drawings of FIGURES 1 and 2, there is provided an evacuated bellows or diaphragm assembly 1 responsive to a change in fluid pressure within a housing 2 which is sealed and vented to the atmospheric altitude pressure, as shown schematically in FIGURE 1.

In the aforenoted arrangement, the evacuated diaphragm assembly 1 transmits motion through rods 3 and 5 slidably positioned in supporting bearings 7 and 9 mounted at opposite ends of the diaphragm assembly 1. A solenoid operated clamping device 11 is so arranged as to clamp one end of the rod 5 and includes clamping arms 12 and 13. The arm 12 is pivotally connected to the arm 13 by a pin 15 and operated by energization of a suitable solenoid 17 to effectively clamp the rod 5 between the arms 12 and 13.

The rod 3 at the opposite end of the diaphragm assembly 1 is operatively connected to a lever 24 through an over travel spring device 25 which is arranged to limit the magnitude of the mechanical signal that may be directed through the lever 24 to a signal generator or electrical position transducer 27 operatively connected at one end of the lever 24 so as to provide an electrical control signal upon a change in altitude from the preselected value effectively positioning the transducer 27 to one side or the other of a null signal position. The lever 24 pivots about a pivot pin 31 positioned intermediate the opposite ends of the lever 24 and so arranged as to produce an amplification of the mechanical motion to the transducer 27.

At the opposite end of the lever 24 from the transducer 27, there is mounted a pin 33 with which there is arranged in cooperative relation a centering and locking mechanism 36. The mechanism 36 includes arms 38 and 40 pivoted at 42 and 44 respectively and biased by spring 46 against a fixed pin 48 and the pin 33 on lever 24 so as to center the lever 24 and lock the lever 24 in a position corresponding to the electrical null position of the transducer 27 upon deenergization of a control solenoid 50. Upon energization of the solenoid 50 the arms 38 and 40 are biased outwardly against the force of the spring 46 so as to release the pin 33 on the arm 24 for free movement.

The solenoid 17 for operating the clamp mechanism 11 and the solenoid 50 for operating the centering and locking device 36 are serially connected and energized from the same source of electrical energy indicated diagrammatically in FIGURE 2 as a battery 52 controlled by an operator-operative switch 54 so that upon the opening of the switch 54 deenergizing the respective control solenoids 17 and 50, the clamp 11 is freed from rod 5 while rod 3 is centered and locked by the action of the centering and locking mechanism 36 acting on the lever arm 24. In this deenergized condition a change in the fluid pressure within the housing effecting the diaphragm assembly 1 will result in a corresponding change in the length of the diaphragm assembly 1 causing rod 5 to move through the bearing 9 and free of the clamping device 11.

In the aforenoted arrangement, when the accompanying autopilot system of a type such as disclosed in U.S. Patent No. 2,512,902, is to be controlled to a constant altitude, the solenoid 17 operating the clamp 11 and the solenoid 50 operating the centering and locking device 36 will be energized by the operator closing the switch 54, when the desired altitude is reached. In this latter mode of operation the clamping device 11 will then clamp rod 5 and anchor that end of the diaphragm assembly 1 while the centering and locking mechanism 36 will be actuated so as to free pin 33 on lever 24 and allow the motion of rod 3 to be transmitted to the sensing transducer 27 through the lever 24. In such operation, the lever 24 will pivot about pivot point 31 producing an amplification of the mechanical motion to the transducer 27. The over travel spring device 25, included in the attachment of the rod 3 to the lever 24, acts to limit the magnitude of the mechanical signal that may be directed to the signal transducer 27.

When the operator desires to change to another mode of control of the autopilot system, the solenoid 17 operating the clamp 11 and the solenoid 50 operating the centering and locking mechanism 36 are deenergized. Upon deenergization of the solenoid 50 the spring 46 of the centering and locking mechanism 36 forces arms 38 and 40 against the fixed pin 48 and the pin 33 on lever 24 centering lever 24 and locking it in a position corresponding to the electrical null signal position of the transducer 27. At the same time the solenoid 17 is deenergized whereupon the clamping device 11 is freed from rod 5 allowing changes in length of the diaphragm assembly 1 to be absorbed by free motion of the rod 5.

In the afore described mechanism, the arrangement of the assembled elements is such that motion of the diaphragm assembly 1 during deenergization of the controlling solenoids 17 and 50 will not effect the positively positioned electrical null of the signal generator or transducer 27. Thus, when the controlling solenoids 17 and 50 are once again energized by the closing of switch 54, there will be thereby selected a controlling altitude corresponding to the then prevailing altitude of the aircraft. Thereafter, control of the autopilot system will be effected through a signal from the transducer 27 proportional to the change in altitude from that of such preselected altitude over a relatively narrow range about the null position. The controlling signal from the transducer 27 may be applied to an aircraft control system or may in turn be amplified through a suitable electric amplifier for use in a conventional manner in the control of the altitude of an aircraft or missile, as the case may be, to the preselected altitude, as explained, in the aforementioned U.S. Patent No. 2,512,902.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a mechanism of a type including a movable signal generator, a device operable to center said generator in a non-signal generating position, a diaphragm assembly responsive to ambient atmospheric pressure changes due to changes in an aircraft altitude level, a control rod connected to one end of said diaphragm assembly, a supporting rod connected to an opposite end of said diaphragm assembly, and means for operatively connecting said control rod and thereby said diaphragm assembly to said signal generator; the improvement comprising a releasable clamping device operable to secure said supporting rod and thereby said diaphragm assembly in an operative position relative to said signal generator, and operator-operative means operable in one sense to render said clamping device operative and said centering device inoperative and alternately operable in another sense to render said clamping device inoperative so as to release said supporting rod while rendering said centering device operative to engage said connecting means so as to center said generator in said non-signal generating position whereupon said diaphragm assembly may move said supporting rod free of said clamping device with changes in the prevailing atmospheric pressure without changing the position of the signal generator held in said non-signal generating position by the engagement of said connecting means by said centering device.

2. The improvement defined by claim 1 in which said connecting means includes a pivoted lever operatively connected to said signal generator and engageable by said centering device.

3. The improvement defined by claim 1 in which said connecting means includes a pivoted lever operatively connected to said signal generator and engageable by said centering device, and an over travel spring device operatively connecting the control rod and thereby the diaphragm assembly to said lever for operating said signal generator upon said centering device being inoperative to engage said lever.

4. A barometric altitude sensitive signal control mechanism comprising, in combination, a movable electrical signal generator having a null signal generating position, an evacuated bellows responsive to ambient atmospheric pressure, a control rod connected to one end of said bellows, a supporting rod connected to an opposite end of said bellows, a bearing for slidably mounting the control rod, another bearing for slidably mounting the supporting rod, a pivoted lever including an over travel spring means for operatively connecting the control rod to said lever, one end of said lever being operatively connected to said movable electrical signal generator, a centering device operable to engage an opposite end of said lever so as to center and hold the the movable electrical signal generator in the null signal position, a releasable clamping device operable to secure said supporting rod and thereby said bellows in an operative position relative to said lever, operator-operative means operable in one sense to render said clamping device operative and said centering device inoperative, and said operator-operative means operable in another sense to render said clamping device inoperative so as to release said supporting rod while rendering said centering device operative to engage said opposite end of said lever so as to center and hold the generator in said null signal generating position whereupon said bellows may move said supporting rod free of said clamping device with changes in the ambient atmospheric pressure without changing the position of the signal generator held in said null signal generating position by the engagement of said opposite end of the lever by said centering device.

References Cited in the file of this patent

UNITED STATES PATENTS

| | | |
|---|---|---|
| 2,512,902 | Rossire | June 27, 1950 |
| 2,657,350 | Rossire | Oct. 27, 1953 |